United States Patent
Crowder et al.

(10) Patent No.: US 10,697,453 B2
(45) Date of Patent: Jun. 30, 2020

(54) LIQUID FUEL DELIVERY COMPRISING A PUMP TO DELIVER LIQUID FUEL FROM A STORAGE SOURCE TO A DELIVERY LOCATION AND A CONTROLLER MITIGATING POWER TO OPERATE THE PUMP ON THE BASIS OF A PREDETERMINED LIQUID THRESHOLD AT THE PUMP INLET

(71) Applicant: Liquid Controls LLC, Lake Bluff, IL (US)

(72) Inventors: Don Crowder, Oklahoma City, OK (US); Grant Davisson, Glen Ellyn, IL (US); Jeremy Patten, Lake Bluff, IL (US)

(73) Assignee: Liquid Controls LLC, Lake Bluff, IL (US)

( * ) Notice: Subject to any disclaimer, the term of this patent is extended or adjusted under 35 U.S.C. 154(b) by 254 days.

(21) Appl. No.: 15/932,314

(22) Filed: Feb. 16, 2018

(65) Prior Publication Data
US 2018/0230996 A1    Aug. 16, 2018

Related U.S. Application Data

(60) Provisional application No. 62/459,887, filed on Feb. 16, 2017.

(51) Int. Cl.
*F04C 14/06* (2006.01)
*F04C 2/344* (2006.01)
(Continued)

(52) U.S. Cl.
CPC ............ *F04C 14/06* (2013.01); *B60P 3/225* (2013.01); *F02B 67/04* (2013.01); *F04C 2/344* (2013.01);
(Continued)

(58) Field of Classification Search
CPC . B60P 3/225; B67D 7/62; F02B 67/04; F04C 14/06; F04C 14/28; F04C 15/008;
(Continued)

(56) References Cited

U.S. PATENT DOCUMENTS

| 3,266,426 A | * | 8/1966 | Brunson | F04C 14/26 137/115.18 |
| 4,090,539 A | * | 5/1978 | Krupp | B67D 7/54 141/198 |

(Continued)

FOREIGN PATENT DOCUMENTS

| DE | 20 2007 012542 U1 | 11/2007 |
| GB | 2 052 061 A | 1/1981 |

OTHER PUBLICATIONS

PCT International Preliminary Report on Patentability from the International Application, PCT/US/2018/000086 dated Aug. 20, 2019, 7 pages.

(Continued)

*Primary Examiner* — Devon C Kramer
*Assistant Examiner* — Benjamin Doyle
(74) *Attorney, Agent, or Firm* — Tucker Ellis LLP; Michael G. Craig; Heather M. Barnes

(57) ABSTRACT

One or more techniques and/or systems are disclosed for providing for improved liquid fuel delivery, by helping to mitigate damage to pumps when operated in an undesired condition. A sensor detects the presence of a liquid fuel at the inlet to the pump during pump operation, and sends the signal to a controller. Based on the detection signal from the sensor, the controller can determine whether a desired amount of liquid is present at the inlet to the pump. If a desired amount of liquid is not identified at the inlet to the pump, the controller may interrupt the power provided by a (Continued)

power supply, which is supplying power to operate the pump, thereby interrupting operation of the pump.

16 Claims, 6 Drawing Sheets

(51) Int. Cl.
*F04C 14/28* (2006.01)
*F02B 67/04* (2006.01)
*F04C 15/00* (2006.01)
*B60P 3/22* (2006.01)
*G08C 17/02* (2006.01)
*B67D 7/62* (2010.01)

(52) U.S. Cl.
CPC ............ *F04C 14/28* (2013.01); *F04C 15/008* (2013.01); *B67D 7/62* (2013.01); *F04C 2210/203* (2013.01); *F04C 2240/81* (2013.01); *F04C 2270/42* (2013.01); *F04C 2270/86* (2013.01); *G08C 17/02* (2013.01)

(58) Field of Classification Search
CPC ............ F04C 2210/203; F04C 2240/81; F04C 2270/42; F04C 2270/86; F04C 2/344; G08C 17/02
See application file for complete search history.

(56) References Cited

U.S. PATENT DOCUMENTS

| | | | | |
|---|---|---|---|---|
| 4,091,846 A * | 5/1978 | Legleiter | ............... | B60P 3/224 137/390 |
| 4,132,899 A * | 1/1979 | Shigemasa | .......... | G01F 23/2925 250/577 |
| 4,880,990 A * | 11/1989 | Rando | ................. | G01F 23/2925 250/577 |
| 5,359,522 A * | 10/1994 | Ryan | ...................... | B67D 7/08 705/413 |
| 5,655,577 A * | 8/1997 | Loen | ...................... | B67D 7/048 141/198 |
| 6,538,261 B1 * | 3/2003 | McConnel | ............ | B67D 7/3272 137/565.16 |
| 6,848,481 B1 * | 2/2005 | Bay | ........................ | B60P 3/2245 116/276 |
| 8,109,300 B2 * | 2/2012 | Brakefield | ............... | B67D 7/04 141/231 |
| 10,065,552 B2 | 9/2018 | Plumski et al. | | |
| 2001/0001179 A1 * | 5/2001 | Healy | ................... | B67D 7/0478 141/59 |
| 2001/0026761 A1 * | 10/2001 | Repple | ..................... | F01P 5/10 417/292 |
| 2002/0098090 A1 * | 7/2002 | Muhs | .................. | B01D 21/0012 417/68 |
| 2005/0183699 A1 * | 8/2005 | Otani | ..................... | F02D 41/221 123/457 |
| 2007/0258827 A1 * | 11/2007 | Gierke | .................. | F04D 15/029 417/6 |
| 2009/0038589 A1 * | 2/2009 | Dingle | ................ | F02D 41/3827 123/480 |
| 2009/0324438 A1 * | 12/2009 | Veilleux, Jr. | .............. | F04B 1/07 418/25 |
| 2010/0266425 A1 * | 10/2010 | Gerum | ..................... | B60T 17/02 417/223 |
| 2010/0307431 A1 * | 12/2010 | Buchanan | ............ | F02D 41/0027 123/3 |
| 2013/0054121 A1 * | 2/2013 | Casoni | ................... | F02D 41/062 701/104 |
| 2014/0257579 A1 * | 9/2014 | Darrow | ................. | G05D 7/0629 700/283 |
| 2016/0153388 A1 * | 6/2016 | Sanborn | ................. | F02M 39/00 123/458 |
| 2017/0368239 A1 * | 12/2017 | Askem | ................ | A61M 1/0035 |

OTHER PUBLICATIONS

Dry Running Protection, Grundfos X website, https://www.grundfos.com/service-support/encyclopedia-search/dry-running-protection.html, 2 pages.

How Can You Prevent Dry Running of Pumps, GemmeCotti European Pumps website, https://www.gemmecotti.com/how-can-you-prevent-dry-running-of-pumps/, 3 pages.

* cited by examiner

LIQUID FUEL DELIVERY COMPRISING A PUMP TO DELIVER LIQUID FUEL FROM A STORAGE SOURCE TO A DELIVERY LOCATION AND A CONTROLLER MITIGATING POWER TO OPERATE THE PUMP ON THE BASIS OF A PREDETERMINED LIQUID THRESHOLD AT THE PUMP INLET

CROSS-REFERENCE TO RELATED APPLICATIONS

This application claims priority to U.S. Provisional Patent Application Ser. No. 62/459,887, entitled LIQUEFIED GAS DELIVERY SYSTEM WITH INTEGRATED VAPOR DETECTION AND PUMP CONTROL, filed Feb. 16, 2017, which is incorporated herein by reference.

BACKGROUND

Pumps can be used to transfer liquid from a source to a target delivery location, such as from a storage vessel to a remote use vessel. A variety of pumps are available to transfer a variety of fluids, including liquids. Positive displacement pumps can be used to force a liquid, through positive displacement, from one location to another. Pumps that are designed to transfer liquids may be susceptible to damage when they are operated in the absence of the target liquid, for extended periods of time, which may lead to higher operational costs associated with pump repair, pump and system maintenance, pump replacement, and operational down-time.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems described herein can be utilized to provide for improved liquid fuel delivery, by helping to mitigate damage to pumps when operated in an undesired condition. A sensor may be used to detect the presence of a liquid fuel at the inlet to the pump, thereby indicative of liquid present in the pump during operation. If sufficient liquid is not detected at the inlet to the pump, an exemplary system may be able to shut off the pump, thereby mitigating pump damage resulting from running the pump in a 'dry' condition.

In one implementation of a system for liquid fuel delivery, a pump, comprising an inlet and an outlet, can be used to pump liquid fuel from a storage source to a delivery location. Further, in this implementation, a sensor can be disposed proximate the inlet of the pump to detect the presence of liquid fuel at the inlet. The sensor can also transmit a detection signal comprising: a first signal indicative of a predetermined amount of liquid fuel present at the inlet; or a second signal indicative of the predetermined amount of liquid fuel not being present at the inlet. Additionally, the system can comprise a power supply that supplies power to operate the pump, and a controller communicatively coupled with the sensor and the power supply to control operation of the power supply. The controller can operably mitigate the power supplied by the power supply to operate the pump upon determination by the controller that a predetermined liquid threshold is not present at the inlet of the pump, based at least upon the detection signal transmitted by the sensor.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
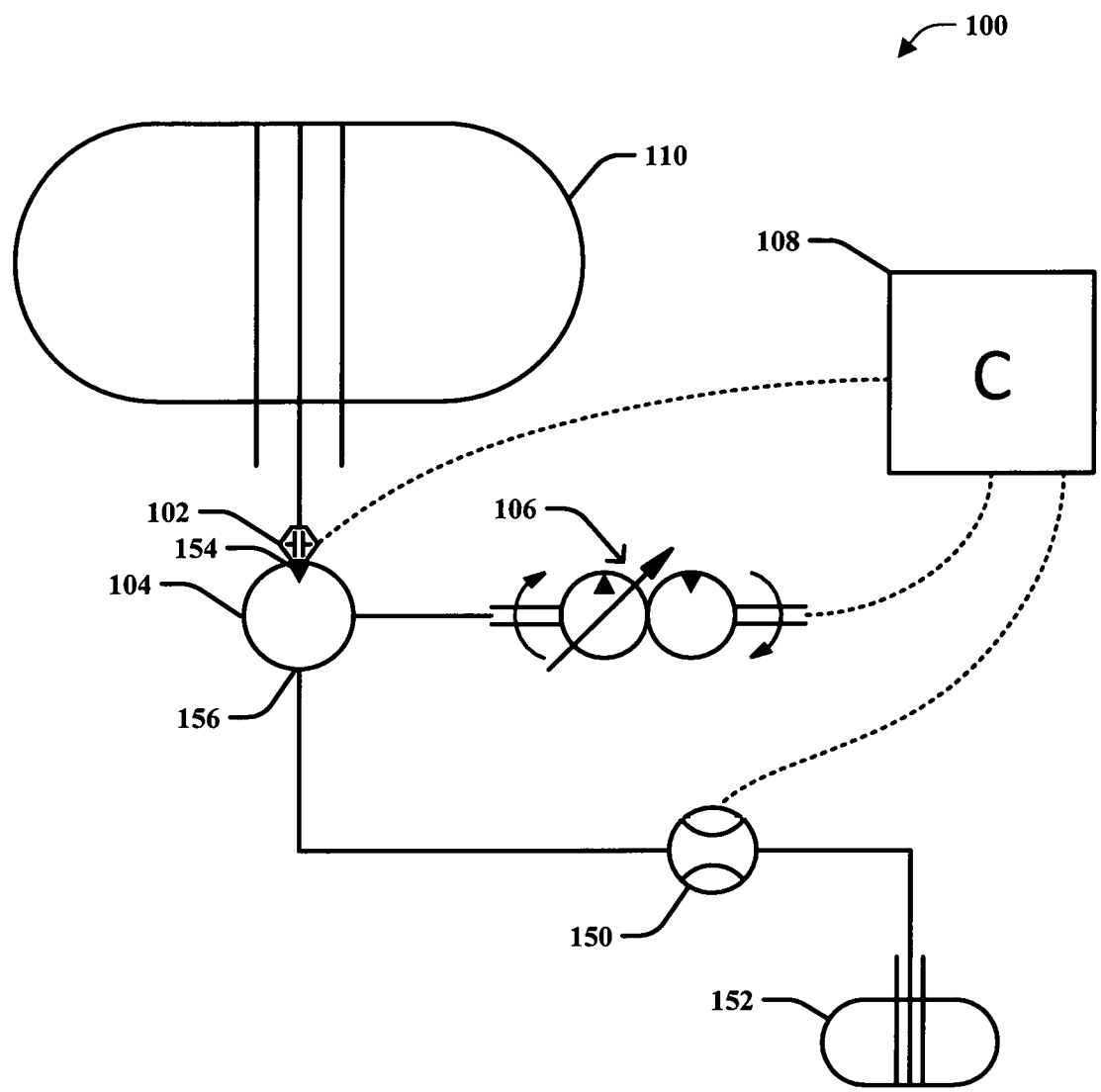
FIG. 1 is a schematic diagram illustrating one implementation of an exemplary system for liquid fuel delivery

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A system can be devised for liquid fuel delivery that provides for interruption of liquid fuel pumping operation if a predetermined amount of liquid fuel is not present at the pump of the fuel delivery system. In one aspect, a system the is able to interrupt the operation of the pump when inadequate liquid fuel is present can help mitigate damage to the pump, and may reduce maintenance and replacement costs associated with such damage, and prolong the useful life of the pump. For example, pumps used for fuel delivery are typically designed to operate under conditions where liquid is present in the pump, during operation. In this example, a pump used for this purpose may be prone to damage when operated in the absence of liquid fuel, also known as running the pump dry. That is, for example, the liquid fuel can provide cooling and lubrication to the pump parts during operation. However, when the pump is operated without the presence of adequate liquid fuel, such as in the dry condition, one or more of the pump parts may be subjected to additional friction, which can lead to excess heating in the pump. In this example, the excess heating condition may result in damage to one or more of the pump's parts, particularly those vulnerable to excess heating, such as vanes and seals.

FIG. 1 is a schematic diagram illustrating one implementation of an exemplary system 100 for liquid fuel delivery. The exemplary system 100 comprises a pump 104 comprising an inlet 154 and an outlet 156. The pump 104 is used to move liquid fuel from a storage source 110 to a delivery location 152. Further, the exemplary system 100 comprises a sensor 102 that is disposed proximate the inlet 154 of the pump 104. The sensor 102 detects the presence of liquid fuel at the inlet 154. The sensor 154 can transmit a detection signal, where the detection signal comprises either a first signal that is indicative of the presence of liquid fuel at a predetermined amount of liquid, or a second signal that is indicative of the predetermined amount of liquid fuel is not present at the inlet.

In one implementation, the predetermined amount of liquid can comprise an amount greater than no fluid present at the inlet (e.g., greater than zero percent volume). In another implementation, the predetermined amount of liquid can comprise an amount greater than ten percent volume of fluid at the inlet. In another implementation, the predetermined amount of liquid can comprise an amount greater than twenty percent volume of fluid at the inlet. In another implementation, the predetermined amount of liquid can comprise an amount greater than thirty percent volume of fluid at the inlet. In another implementation, the predetermined amount of liquid can comprise an amount greater than forty percent volume of fluid at the inlet. In another implementation, the predetermined amount of liquid can comprise an amount greater than fifty percent volume of fluid at the inlet.

In FIG. 1, the exemplary system 100 can comprise a power supply 106 that supplies power to operate the pump 104. As an example, the pump 104 may be mechanically operated, electrically operated, hydraulically operated, or operated by some other form of power. In this example, the power supply 106 can comprise a type that provides the appropriate form of power, such as mechanical power, electrical power, hydraulic power, or another form of power to operate the pump 104.

In one implementation, the power supply 106 can comprise a mechanical power take-off, which draws power from an engine, and provides that power to operate the pump 104. For example, a power take-off may provide rotational power (e.g., moment or torque) to a power input of the pump 104, resulting in operation of the pump 104. In one implementation, the pump 104 can comprise a rotary vane type pump, which uses rotational power to provide the pumping operation. As one example, the power take-off can be operably coupled with a rotary vane pump, and provide rotational power to the pump to drive the pumping operation. It should be appreciated that other types of power supplies and/or pumps may be used in the example systems, described herein; and it anticipated that those skilled in the art may devise alternate power supply-pump combinations that can be used. For example, a hydraulic power source can also provide rotational power to a vane pump, or another type of rotationally operated pump; as can an electrical power source (e.g., electrical generator, stored electrical power system, and utility generated electrical power). As another example, other types of pumps can include reciprocating-type positive displacement pumps, linear-type positive displacement pumps, hydraulic pumps, diaphragm pumps, and many more.

In FIG. 1, the exemplary system 100 can comprise a controller 108 that is communicatively coupled with the sensor 102 and the power supply 106. In this system 100, the controller 108 can be used to control operation of the power supply 106. The controller 108 can operably mitigate (e.g., reduce, lessen, shut-off, or stop) the power supplied by the power supply 106 to operate the pump 104. This can occur when the controller 108 determines that that a predetermined liquid threshold is not present at the inlet 154 of the pump 104, based at least upon the detection signal that is transmitted by the sensor 102. In some implementations, as illustrated in FIG. 1, the exemplary system may also comprise a flow meter 150, that can be used to determine an amount of liquid fuel that is transferred from the fuel source 110 (e.g., a storage tank or other vessel) to the delivery location 152 (e.g., another tank or vessel). In some implementations, the flow meter 150 can also be communicatively coupled with the controller 108, for example, such that the controller 108 may register an amount of liquid fuel delivered.

As an example, the controller 108 can receive the detection signal from the sensor 102 during a pumping operation, to transfer liquid fuel between the source 110 and delivery location 152. In this example, based on the detection signal received, the controller may determine if there is a desired amount of liquid (e.g., meeting the predetermined liquid threshold) flowing through the inlet, into the pump 104, thereby providing adequate lubrication and/or cooling to the pump 104 during operation. In this example, if the controller 108 determines that an appropriate amount of liquid is present, pumping operations can continue, at least until the controller determines that the amount of liquid present is no longer meeting the predetermined liquid threshold. Upon determining that the amount of liquid present does not meet the predetermined liquid threshold, based at least upon the received detection signal, for example, the controller can shut down operation of the power supply 106, thereby effectively shutting down operation of the pump 104. In this way, in this example, damage to the pump, which may occur when the pump is run dry (e.g., operated with an inadequate amount of liquid), can be mitigated.

Figure 2:
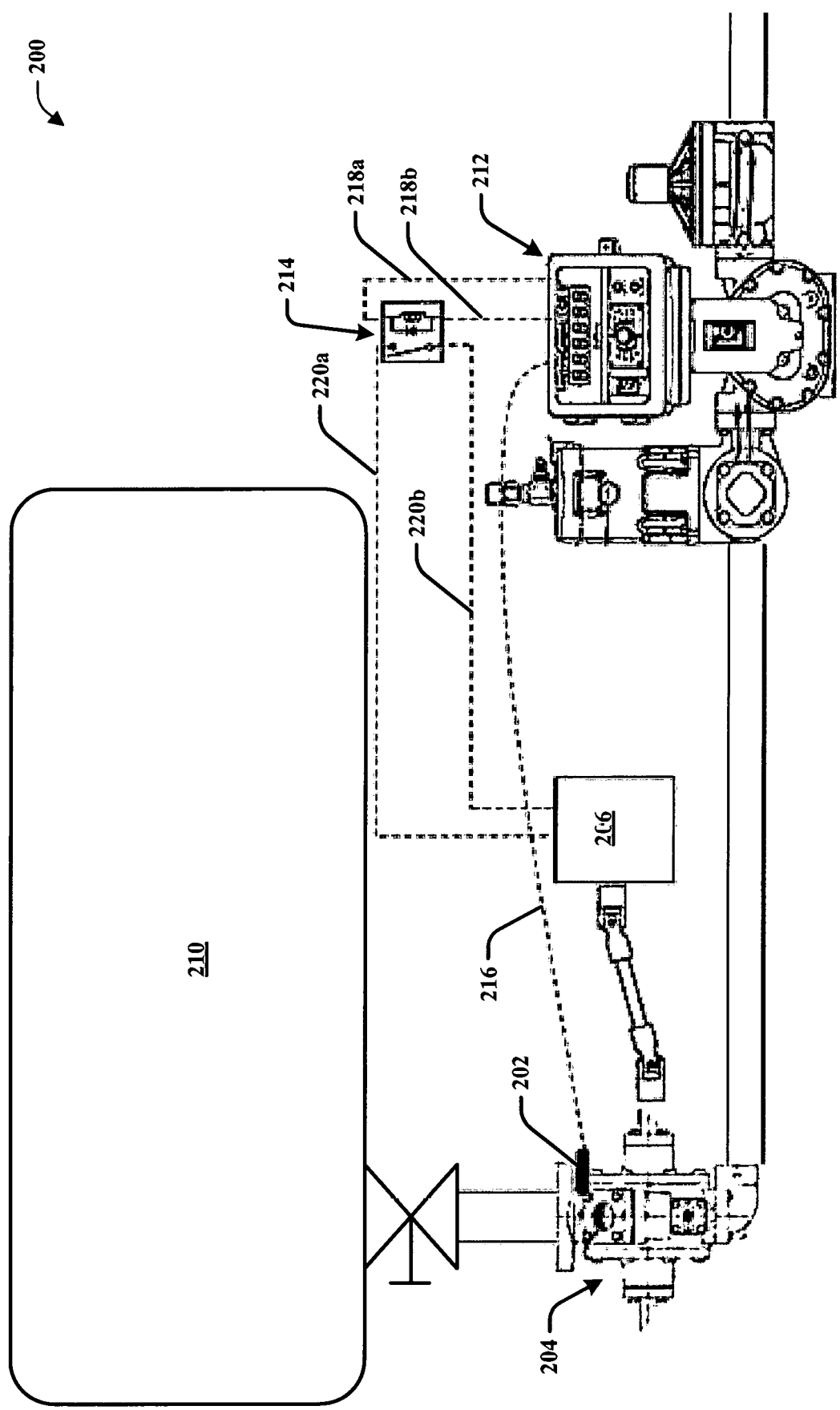
FIG. 2 is a component diagram illustrating an example implementation where one or more portions of one or more systems and techniques described herein may be implemented.
Figure 3B:
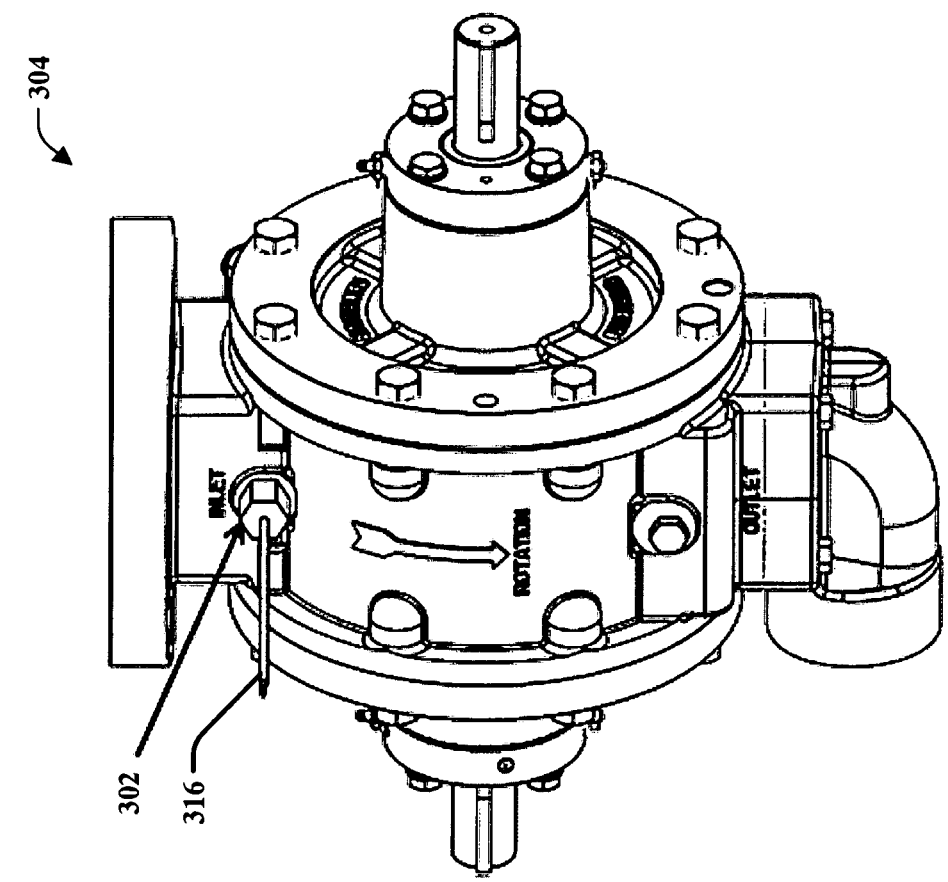
FIGS. 3A and 3B are a component diagrams illustrating example implementations where one or more portions of one or more systems and techniques described herein may be implemented.
Figure 3A:
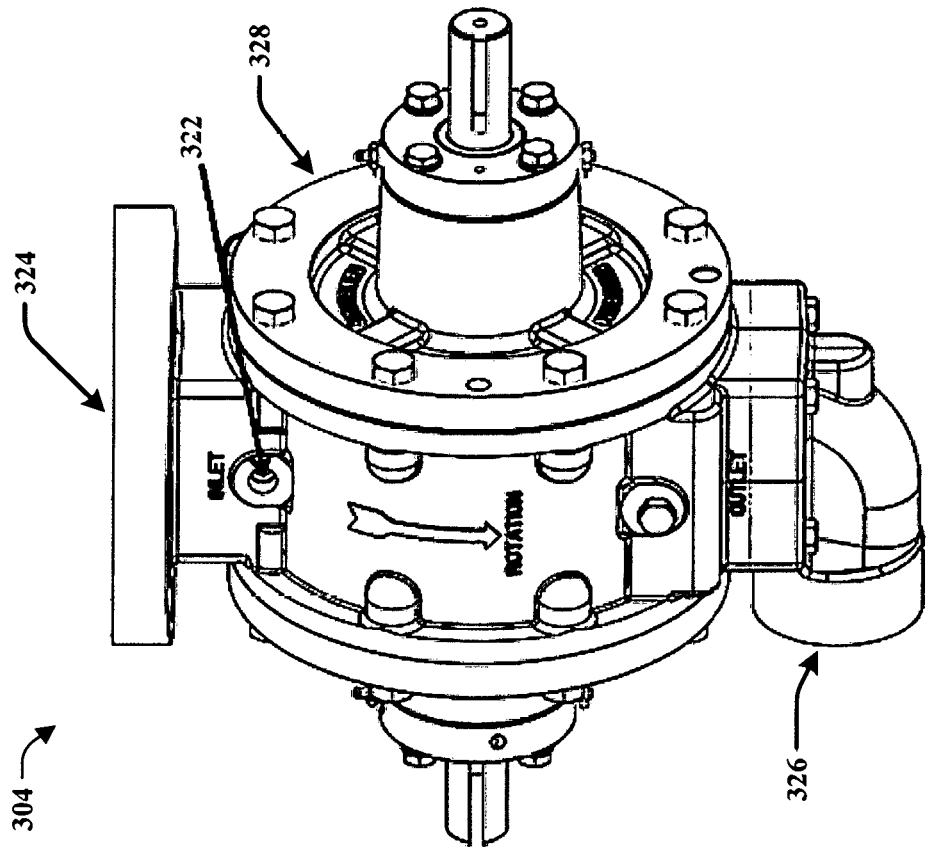

FIGS. 2, 3A and 3B are component diagrams illustrating an example implementation of one or more portions of one or more systems described herein. FIG. 2 illustrates one example implementation of the exemplary system for liquid fuel delivery. In this implementation, a liquid fuel storage vessel 210 can be the source of the delivered liquid fuel. In one implementation, the liquid fuel storage vessel 210 can be mounted on a fuel delivery vehicle 200, such as a propane truck, or similar vehicle. As an example, a fuel delivery vehicle, such as those that deliver pressured gas fuels in the form of liquid, typically pump the liquid fuel from a source pressurized vessel to a target delivery vessel (e.g., 152 of FIG. 1), that is also pressurized. In this example, this type of liquid fuel transfer is often performed using a positive displacement pump to draw the liquid from the source and drive it into the target location.

As illustrated in FIG. 2, an example system, such as mounted on a vehicle 200, can comprise a pump 204 that can also be mounted on the vehicle, and is fluidly coupled with the liquid fuel storage vessel 210, such as through a valve. Further, the example system can comprise a sensor 202 disposed proximate the pump's inlet, for example, disposed in the inlet of the pump 204. It is anticipated that those skilled in the art may provide alternate locations for disposing the sensor, in order to detect the presence of liquid at the inlet, such as in a fluid conduit prior to the inlet.

As an illustrative example, in one implementation, as illustrated in FIGS. 3A and 3B, the pump 304 can comprise a sensor coupler 322 that is disposed at the inlet 324 of the pump 304. In this implementation, the sensor coupler 322 can comprise an internally threaded port between the inlet 324 and the outside of the pump 304. The sensor coupler 322 can selectably, threadedly engage with the sensor 302 to dispose the sensor in the inlet 324. In this way, for example the sensor may be able to detect the presence of liquid that is flowing through the inlet, and into the pump body 328. In this example, the pump body 328 can comprise a rotary vane-type pump that utilizes rotating vanes in a pump cavity to draw liquid from the inlet 324 to the outlet 326 of the pump 304. Further, the rotating vanes, and seals in the pump may comprise a material that is susceptible to damage (e.g., deformation, chipping, tearing, cracking, or material loss) when subjected to elevated temperatures (e.g., outside of a specified operational range). In some implementations, the vanes and/or seals can be made of a polymer, silicone, or rubber-based material, that can be damaged at elevated temperatures, which may be achieved if the pump is operated in a dry condition (e.g., without adequate liquid present).

Figure 4A:
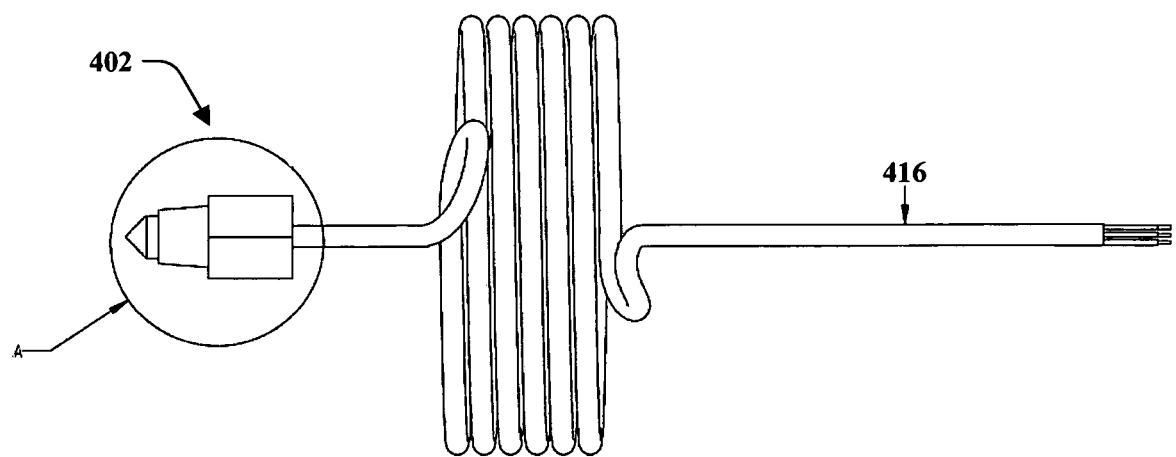
FIGS. 4A and 4B are a component diagrams illustrating example implementations where one or more portions of one or more systems and techniques described herein may be implemented.
Figure 4B:
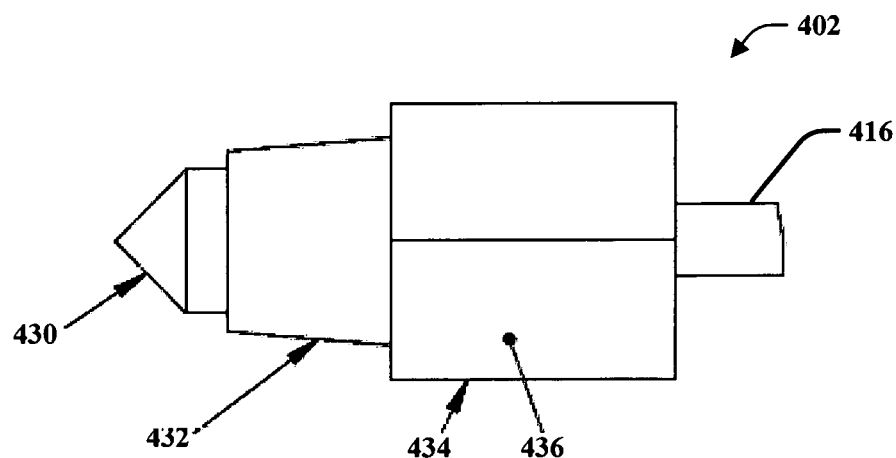

As another illustrative example, in one implementation, as illustrated in FIGS. 4A and 4B, the sensor 402 (e.g., 102, 202 from FIGS. 1 and 2 respectively) can comprise an optical sensor. As an example, an optical sensor can transmit a light signal into the fluid conduit (e.g., pipe, pump inlet), such as proximate or in the pump inlet, and receive reflected light in return. In this example, based on the amount and/or type of reflected light received by the sensor, it can identify how much liquid (e.g., or alternately absence of liquid, or amount of vapor) is present in the fluid conduit. Further, in this implementation, the sensor can transmit a signal (e.g., the detection signal) over a communications coupling 416 (e.g., a communications cable), such as to the controller (108 of FIG. 1).

In one implementation, the sensor 402 can be calibrated to send the first signal if a predetermined amount of fluid is detected, and the second signal if the predetermined amount of fluid is not detected (e.g., or a predetermined amount of vapor is detected). As an example, the sensor 402 may transmit a high voltage (e.g., or other electrical property) signal in the presence of excess vapor, such as when insufficient liquid is not present in the inlet, which is indicative of the second signal. As an example, the sensor 402 may transmit a low voltage (e.g., or other electrical property) signal (e.g., or no signal) when detecting the presence of sufficient liquid in the inlet, which is indicative of the first signal. In one implementation, the sensor can be calibrated to transmit the high signal (e.g., second signal) when less than one-hundred percent liquid is detected. In one implementation, the sensor can be calibrated to transmit the high signal (e.g., second signal) when less than ninety percent liquid is detected. In one implementation, the sensor can be calibrated to transmit the high signal (e.g., second signal) when less than eighty percent liquid is detected. In one implementation, the sensor can be calibrated to transmit the high signal (e.g., second signal) when less than seventy-five percent liquid is detected. In one implementation, the sensor can be calibrated to transmit the high signal (e.g., second signal) when less than seventy percent liquid is detected. In one implementation, the sensor can be calibrated to transmit the high signal (e.g., second signal) when less than sixty percent liquid is detected. In one implementation, the sensor can be calibrated to transmit the high signal (e.g., second signal) when less than fifty percent liquid is detected.

As illustrated in FIG. 4B, the sensor 402 can comprise an optical prism 430, used to send and receive the light signal, into and from the conduit. The sensor 402 can comprise conduit seat coupler 432 that can selectably, fixedly engage the sensor with a conduit, such as the inlet of the pump. As an example, the conduit seat coupler 432 can comprise external threads that are configured to threadedly engage with the internal threads of the sensor coupler 322, of FIG. 3A, disposed in the inlet of the pump. Further, the sensor 402 can comprise a tool engagement portion 434 that is configured to provide a surface for a tool to facilitate fastening the sensor 402 to the conduit, such as at the inlet. For example, the tool engagement portion 434 can comprise a hex nut configuration, for receiving a wrench, socket or the like. Additionally, the sensor 402 can comprise a sensor body 436 that houses sensing components, and couples them with the sensor to controller connection 416. It should be appreciated that, while a hard line connection (e.g., 416) is shown), the systems described herein are not limited to this embodiment. For example, it is anticipated that wireless communication coupling can be implemented in the systems described herein, for sending and receiving signals, data, and other transmissions.

Returning to FIG. 2, with continued reference to FIGS. 3A, 3B, 4A, and 4B, the sensor 202 can be communicatively coupled with a register component 212, comprising processor. The sensor-register communicative coupler 216 can comprise a wired connection as illustrated in FIGS. 3B (316), and 4A (416); or the sensor-register communicative coupler 216 can comprise a wireless connection, such as using radio signals, such as WiFi, short-wavelength UHF radio waves (e.g., Bluetooth and the like), or other short range wireless communications. The sensor-register communicative coupler 216 can be used to transmit the detection signal from the sensor 202 to the register 212. In one implementation, at least a portion of the sensor-register communicative coupler 216 can be used to provide electrical power to the sensor, such as provided by the register 212. In other implementations, power can be provided to the sensor using other appropriate components (e.g., batteries, connection to alternate electrical power source, etc.).

In the example system of FIG. 2, a power supply 206, such as a power take-off, can be used to provide power to the pump 204. In one implementation, the power source 206 can comprise a power take-off that is mounted on the vehicle 200, such as coupled to an engine mounted on the vehicle (e.g., via a transmission). In this implementation, the power take-off can be engaged with the pump 204, such as using a drive shaft, or other appropriate means. For example, the power take-off can be rotatably engaged with the drive shaft, and the drive shaft can be rotatably coupled to the pump 204. In this way, rotational power provided by the power take-off can be transmitted to the pump, resulting in rotation of the pump 204.

Figure 5:
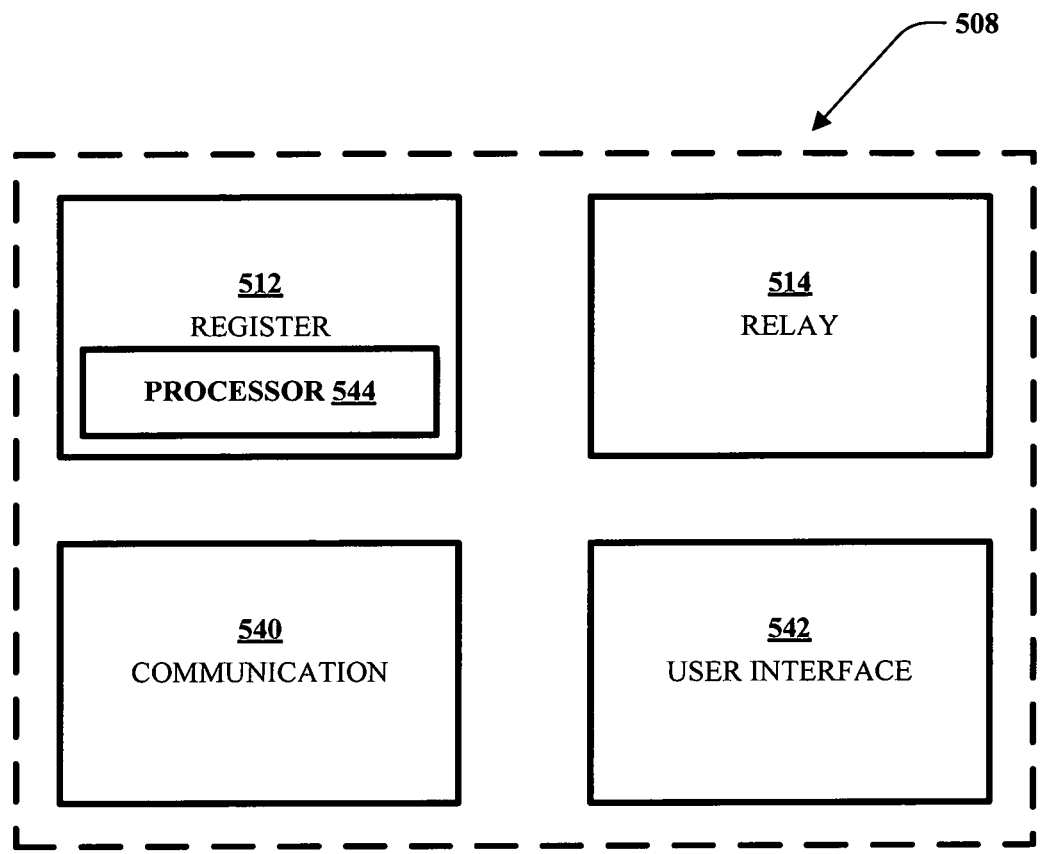
FIG. 5 is a component diagram illustrating an example implementation where one or more portions of one or more systems and techniques described herein may be implemented.

FIG. 5 is a schematic diagram illustrating an example of one embodiment of a controller 508, which may be implemented in one or more portions of one or more systems described herein. As illustrated in FIG. 5, with continued reference to FIG. 2, a controller can comprise a register 512 (e.g., 212 in FIG. 2), and a relay (e.g., 214 in FIG. 2). It should be appreciated that the components of the controller 508 may be distributed, such as illustrated in FIG. 2 (e.g., wounded on a vehicle 200), or may be disposed together in a housing or component system. The register 212, 512 can be configured to send and receive signals throughout portions of the system, and can comprise a processor 544. In one implementation, processor 544 can receives data indicative of the detection signal (e.g., received by the register 512), and determine whether the predetermined liquid threshold is present in the pump inlet (e.g., 154 of FIG. 1, 304 of FIG. 3A) based at least upon the data indicative of the detection signal. That is, for example, the register 212, 512 can receive the detection signal from the sensor 202, and the processor can identify if the predetermined liquid threshold is present.

In one implementation, the determining that the predetermined liquid threshold is present in the pump 204 can comprise receiving the data indicative of the detection signal over a predetermined time period. For example, the controller 508, comprising the register 512, can receive one or more detection signals from the sensor 202 of a preset time period. As an example, the preset time period may be adjusted depending on the situation of use for the pump, such as the type of liquid fuel, the environmental temperature, the type of pump used, etc. These characteristics may be determinative based on the operating specifications of the pump (e.g., how quickly the pump can be damaged, and under what liquid levels this may occur). In one implementation, the predetermined time period can comprise approximately ten seconds. In this implementation, the sensor may be transmitting periodic (e.g., or continuous) detection signals. Further, the controller 508, comprising the register 512, can receive retain these series of signal in memory (e.g., on-board flash or RAM).

In this implementation, the determining that the predetermined liquid threshold is present in the pump 204 can further comprise identifying the ratio of any received first signals to any received second signal from the detection signals received during the predetermined time period. That is, for example, the number of received first signals can be identified, and the number of second signals can be identified, and the ratio of these two numbers can be determined by the processor. Additionally, the determining that the predetermined liquid threshold is present in the pump 204 can comprise determining that the identified ratio is within a predetermined ratio threshold indicative of the presence of the predetermined liquid threshold. For example, pump operational specifications (e.g., and/or field observation, and/or laboratory testing) may be used to identify a threshold (e.g., or threshold range) for the presence of liquid in the pump during operation, that is desired to mitigate damage (e.g., from dry running) for a particular situation. In this example, the predetermined ratio threshold indicative of the presence of the predetermined liquid threshold can be set based on this analysis.

As one illustrative example, if the sensor 202 detects vapor present in the inlet of the pump 204 at or above seventy-five percent, the sensor 202 may indicate a high signal (e.g., second signal) in the detection signal. In this example, the register 212 can receive the high signal, and continues to receive subsequent detection signals (e.g., some of which may be low, and others high) from the sensor 202 over a period of ten seconds. The processor 544 can then (e.g., in real-time) determine the ratio of high to low signals (e.g., second to first signals) over the ten second period (e.g., or continuous overlapping ten second periods). In this example, this ratio can be compared to the predetermined ratio threshold indicative of the presence of the predetermined liquid threshold, to determine if the predetermined ratio threshold is met, indicative of sufficient liquid in the inlet. As an example, if the number of high (e.g., second) signals is greater than fifty percent (e.g., greater than a one to one ratio), then the processor may indicate that the predetermined ratio threshold is not met (e.g., which is 50%), and therefore the predetermined liquid threshold is also not met.

As illustrated in FIGS. 2 and 5, the controller 508 (e.g., 108 of FIG. 1) can comprise a relay 214, 514. The relay 214, 514 can be in communicative coupling (e.g., wired and/or wireless) with the register 212, 512. For example, the register-relay communicative coupling 218a, 218b can comprise a wired connection, such as a powered connection (e.g., providing electrical power), and communications coupling (e.g., transmitting signals, data, etc.). The relay can be configured to shut off the power supply 206 upon receiving a shut-off signal from the processor 544 (e.g., the shut-off signal could also comprise the absence of an operational signal, thereby indicating a shut-off condition). In this implementation, the shut-off signal can result from the processor 544 determining that the predetermined liquid threshold is not met for the liquid present in the pump inlet. For example, the relay 214, 514 can comprise a type of switch that is in communicative coupling (e.g., wired and/or wireless) with the register 212, 512. As an example, the relay-power supply communicative coupling 220a, 220b can comprise a wired connection, such as a powered connection (e.g., providing electrical power), and communications coupling (e.g., transmitting signals, data, etc.). In this example, when the relay 214, 514 receives the shut-off signal from the processor 544 (e.g., from the register 212, 512), the relay 214, 514 can cease sending a power signal to the power supply 206. In one implementation, the relay 214, 514 can comprise a switch that provides a power signal to the power supply 206 when in a closed position, and interrupts the power signal to the power supply in an open position.

As an illustrative example, the exemplary system 100 can comprise a vehicle mounted system 200. In this example, a vehicle operator can deliver liquid fuel from the vehicle mounted storage vessel 210 to a remotely located delivery target (e.g., 152 of FIG. 1). The operator can initiate the pumping operation by activating the controller 108, 508, including the register 212, 512, which provides a signal to power supply 206 (e.g., comprising a power take-off drawing power from the vehicle's engine), through the relay. In this example, the power supply 206 can provide power to the pump 204 to perform the pumping operation, moving the liquid fuel from the storage vessel 210 to the delivery target.

In this example, during operation, the sensor 202 detects the presence of liquid (or not) at the inlet of the pump 204, and sends the appropriate signal to the controller 108, 508. The controller 108, 508, using the processor 544, determines whether there is sufficient liquid at the inlet, and continues to allow operation of the power supply 206, thereby continuing operation of the pump 204. Upon determining that the sensor is indicating a level of liquid at the inlet to the pump that is below the threshold (e.g., indicating a run dry condition), the processor 544 can provide a signal (e.g., through the register) to the relay 214, 514 to interrupt the power signal to the power supply 206. In this way, the power to operate the pump will be interrupted, and the pump will cease operation, thereby mitigating damage to the pump.

In one implementation, as illustrated in FIG. 5, the controller can comprise a communications component 540 that provides a notification to a user of the system that the power supplied by the power supply to operate the pump has been shut off. For example, upon interrupting the power signal to the power supply, the communications component 540 can provide a signal to the vehicle operator that the pumping operation is being shut down. In one implementation, the controller 508 can comprise a user interface 542. The user interface 542 can be used by the operator to interact with the system, such as to initiate pumping operation, view operating parameters and/or sensor readings, and be alerted of operational conditions, such as a power supply shut-off.

Figure 6:
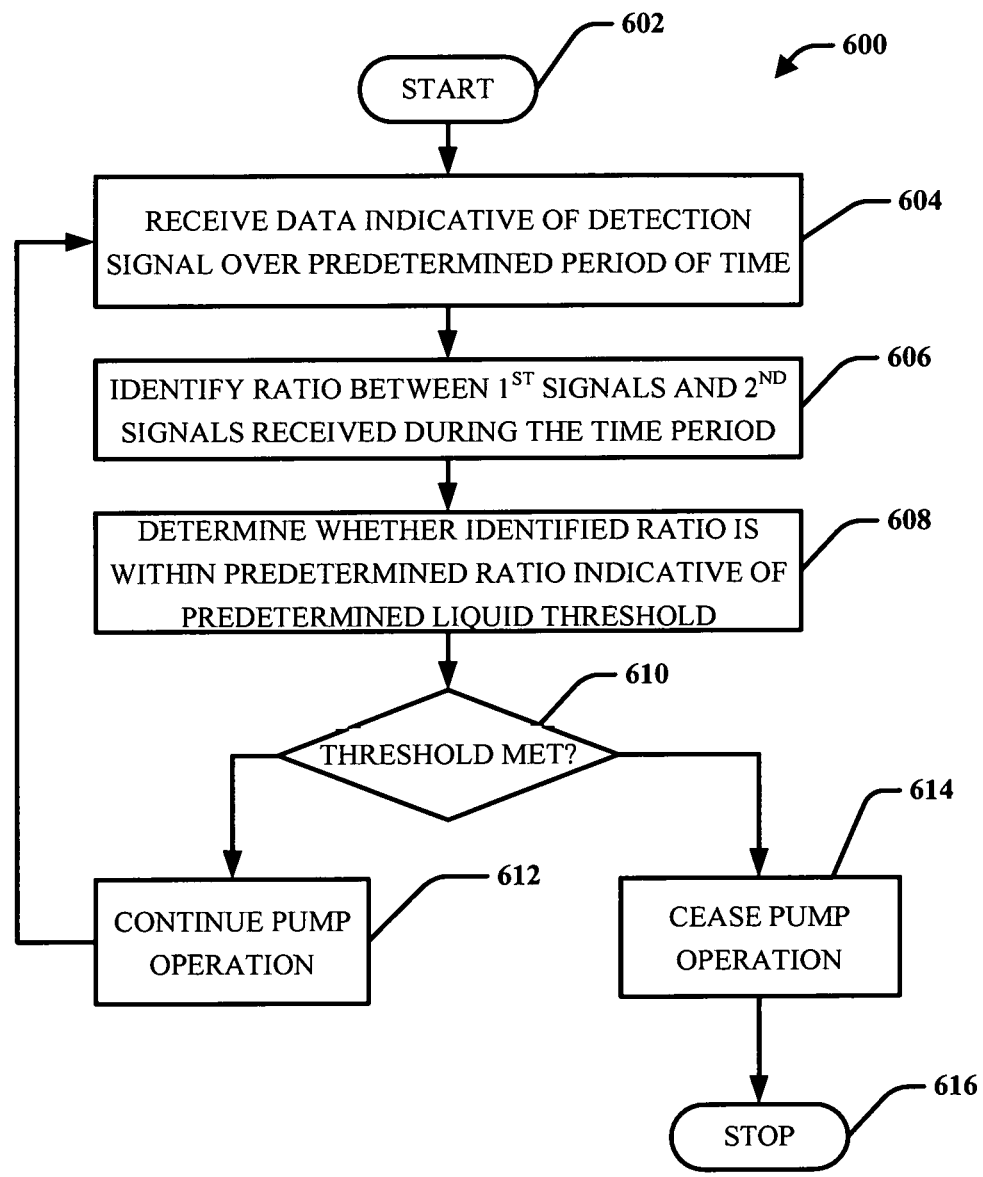
FIG. 6 is a flow diagram illustrating an exemplary method for liquid fuel delivery.

FIG. 6 is a flow diagram illustrating an exemplary method 600 for liquid fuel delivery. In this example, the method starts at 602. For example, the method may begin when an operator initiates pumping operating for delivery fuel from a source storage vessel to a delivery target. At 602, the processor, disposed in the register, can begin to receive data indicative of the detection signal provided by the sensor disposed at the inlet of the pump. The one or more detection signals can be received by the processor over a predetermined period of time. For example, once the pumping operation is under way, the sensor can detect the presence of a sufficient amount of liquid at the inlet (e.g., or not), and send the detection signal, comprising the first signal (e.g., or second signal if liquid not sufficiently detected).

At 606, the processor can identify a ratio for the detection signal, comprising a ratio of first signals to second signals received over the time period. For example, the one or more detection signals received by the processor over the predetermined time period can comprise zero of more first signals and zero or more second signals. In this example, the processor can determine the ratio of first and second signals received. At 608, the processor can determine whether the identified ratio from the predetermined time period meets a predetermined ratio threshold, which is indicative of a predetermined liquid threshold. For example, the predetermined ratio threshold can correlate to the predetermined liquid threshold, which indicates if a sufficient amount of liquid is present at the pump's inlet. In this example, the processor can compare the identified ratio to the predetermined ratio (e.g., such as stored in local memory), to determine if the predetermined liquid threshold is met.

At 610, if the processor determines that the predetermined liquid threshold is met, pumping operations can continue, at 612. Further, the example, method 600 iterates back to 604 to continue monitoring the sensor signals. However, at 610, if the processor determines that the predetermined liquid threshold is not met, pumping operations may cease, at 614. For example, if the processor determines that the predetermined liquid threshold is not met, it may be indicative of a situation where insufficient liquid is being drawn through the pump inlet to the pump. In this example, this situation may lead to pump damage, which in-turn may result in replacement or early maintenance of the pump. Having ceased pump operation, the example method 600 ends at 616.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system for liquid fuel delivery, comprising:
a pump, comprising an inlet and an outlet, to pump liquid fuel from a storage source to a delivery location;
a sensor disposed proximate the inlet of the pump, the sensor detecting the presence of liquid fuel at the inlet, and transmitting a detection signal comprising one of:
a first signal indicative of a predetermined amount of liquid fuel present at the inlet; and
a second signal indicative of the predetermined amount of liquid fuel not being present at the inlet;
a power supply that supplies power to operate the pump; and
a controller communicatively coupled with the sensor and the power supply to control operation of the power supply, the controller operably mitigating the power supplied by the power supply to operate the pump upon determination by the controller that a predetermined liquid threshold is not present at the inlet of the pump, based at least upon the detection signal transmitted by the sensor, the controller comprising a processor that receives data indicative of the detection signal, and determines whether the predetermined liquid threshold is present in the pump inlet based at least upon the data indicative of the detection signal:

wherein, the determining that the predetermined liquid threshold is present in the pump comprises:
receiving the data indicative of the detection signal over a predetermined time period;
identifying a ratio of any received first signals to any received second signal from the detection signals received during the predetermined time period; and
determining that the identified ratio is within a predetermined ratio threshold indicative of the presence of the predetermined liquid threshold.

2. The system of claim 1, the pump comprising a rotary vane pump.

3. The system of claim 1, the pump comprising a sensor coupler disposed at the inlet, and comprising an internally threaded port between the inlet and the outside of the pump selectably, threadedly engaged with the sensor to dispose the sensor in the inlet.

4. The system of claim 1, the sensor comprising an optical sensor.

5. The system of claim 1, the power supply comprising a mechanical power take-off operably coupled with an engine.

6. The system of claim 5, the power take-off, engine, pump, and storage source mounted on a vehicle.

7. The system of claim 1, the power supply comprising one of an electrical power source and a hydraulic power source.

8. The system of claim 1, the controller comprising a relay that shuts off the power supply upon receiving a shut-off signal from the processor, the shut-off signal resulting from the processor determining that the predetermined liquid threshold is not met in the pump inlet.

9. The system of claim 1, the controller comprising a communications component that provides a notification to a user of the system that the power supplied by the power supply to operate the pump has been shut off.

10. The system of claim 1, the predetermined liquid threshold in the pump inlet indicative of the presence of sufficient liquid passing through the inlet to mitigate damage to the pump during operation.

11. A method for liquid fuel delivery, comprising:
using a pump, comprising an inlet and an outlet, to pump liquid fuel from a storage source to a delivery location;
using a sensor disposed proximate the inlet of the pump, to detect the presence of liquid fuel at the inlet, and using the sensor to transmit a detection signal comprising one of:
a first signal indicative of liquid fuel present at a predetermined amount of liquid at the pump inlet; and
a second signal indicative of liquid fuel not being present at the predetermined amount of liquid at the pump inlet;
using a power supply to supply power to operate the pump; and
using a controller that is communicatively coupled with the sensor and the power supply to control operation of the power supply, wherein the controller operably mitigates the power supplied by the power supply to operate the pump upon determination by the controller that a predetermined liquid threshold is not present at the inlet of the pump, based at least upon the detection signal transmitted by the sensor, wherein a processor disposed in the controller is used to receive data indicative of the detection signal, and to determine whether the predetermined liquid threshold is present in the pump inlet based at least upon the data indicative of the detection signal;

wherein, using the processor to determine that the predetermined liquid threshold is present in the pump comprises:
receiving the data indicative of the detection signal over a predetermined time period;
identifying a ratio of any received first signals to any received second signal from the detection signals received during the predetermined time period; and
determining that the identified ratio is within a predetermined ratio threshold indicative of the presence of the predetermined liquid threshold.

12. The method of claim 11, comprising, using a relay to shut off the power supply upon receiving a shut-off signal from the processor, the shut-off signal resulting from the processor determining that the predetermined liquid threshold is not present in the pump inlet.

13. The method of claim 11 comprising, using a communications component to provide a notification to a user of the system that the power supplied by the power supply to operate the pump has been shut off.

14. The method of claim 11, using the controller to determine that the predetermined liquid threshold is not present at the inlet of the pump comprising, identifying the presence of sufficient liquid passing through the inlet to mitigate damage to the pump during operation.

15. A liquid fuel delivery vehicle, comprising:
a liquid fuel storage vessel mounted on a fuel delivery vehicle;
a pump mounted on the vehicle to pump liquid fuel from the storage vessel to a delivery location, the pump comprising an inlet and an outlet;
a sensor disposed in the inlet of the pump, the sensor detecting the presence of liquid fuel at the inlet, and transmitting a detection signal comprising one of: a first signal a first signal indicative of a predetermined amount of liquid fuel present at the inlet; and a second signal indicative of the predetermined amount of liquid fuel not being present at the inlet;
a power take-off mounted on the vehicle to supply power to operate the pump, the power take-off operably coupled to an engine mounted on the vehicle; and
a controller communicatively coupled with the sensor and the power take-off to control operation of the power take-off, the controller operably shutting off the power supplied by the power take-off to operate the pump upon determination by the controller that a predetermined liquid threshold is not present at the inlet of the pump, based at least upon the detection signal transmitted by the sensor, the controller comprising a processor that receives data indicative of the detection signal, and determines whether the predetermined liquid threshold is present in the pump inlet based at least upon the data indicative of the detection signal:
wherein, the determining that the predetermined liquid threshold is present in the pump comprises:
receiving the data indicative of the detection signal over a predetermined time period;
identifying a ratio of any received first signals to any received second signal from the detection signals received during the predetermined time period; and
determining that the identified ratio is within a predetermined ratio threshold indicative of the presence of the predetermined liquid threshold.

16. The vehicle of claim 15, the predetermined amount of liquid comprising more than a zero volume of liquid flowing through the inlet.

* * * * *